(12) United States Patent
Kita et al.

(10) Patent No.: US 11,603,136 B2
(45) Date of Patent: Mar. 14, 2023

(54) VEHICLE BODY

(71) Applicant: Honda Motor Co., Ltd., Tokyo (JP)

(72) Inventors: Ryo Kita, Saitama (JP); Hideyuki Yamaguchi, Saitama (JP); Momoka Fujii, Saitama (JP); Takayuki Fukami, Yokohama (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 17/189,283

(22) Filed: Mar. 2, 2021

(65) Prior Publication Data

US 2021/0276620 A1  Sep. 9, 2021

(30) Foreign Application Priority Data

Mar. 3, 2020  (JP) .............................. JP2020-035965

(51) Int. Cl.
*B62D 21/15* (2006.01)
*B62D 25/08* (2006.01)
(Continued)

(52) U.S. Cl.
CPC ............ *B62D 21/152* (2013.01); *B60R 19/38* (2013.01); *B62D 25/085* (2013.01); *B60R 19/24* (2013.01); *B60R 19/34* (2013.01)

(58) Field of Classification Search
CPC .... B62D 21/152; B62D 25/085; B60R 19/38; B60R 19/34; B60R 19/24
(Continued)

(56) References Cited

U.S. PATENT DOCUMENTS

2017/0129432 A1* 5/2017 Daido ................. B62D 21/152
2017/0151919 A1* 6/2017 Kashiwagi ............. B60R 19/34

FOREIGN PATENT DOCUMENTS

JP  2017087766  5/2017
JP  2017100555  6/2017
(Continued)

OTHER PUBLICATIONS

"Office Action of Japan Counterpart Application" with English translation thereof, dated Sep. 29, 2021, p. 1-p. 8.
(Continued)

*Primary Examiner* — D Glenn Dayoan
*Assistant Examiner* — Dana D Ivey
(74) *Attorney, Agent, or Firm* — JCIPRNET

(57) ABSTRACT

A vehicle body for contributing to weight reduction of a structure of a front part while preventing a front bumper beam from falling off is provided. A vehicle body includes: pairs of left and right support bodies, being disposed on the left and the right with an accommodation space of a power unit interposed therebetween, extending in a vehicle body forward-rearward direction, and having joint surfaces displaced rearward as the joint surfaces going outward in a vehicle width direction while facing the front; a front bumper beam, extending in a vehicle body lateral direction across the front of the accommodation space and being joined to the joint surfaces at both ends thereof; and engagement members, extending forward from inner sides of the joint surfaces in the vehicle width direction and engaging with the front bumper beam in the forward-rearward direction at least at a time of a collision.

12 Claims, 7 Drawing Sheets

(51) Int. Cl.
  *B60R 19/38* (2006.01)
  *B60R 19/24* (2006.01)
  *B60R 19/34* (2006.01)

(58) Field of Classification Search
  USPC .................................................. 296/203.02
  See application file for complete search history.

(56) References Cited

FOREIGN PATENT DOCUMENTS

| | | |
|---|---|---|
| JP | 2019018600 | 2/2019 |
| KR | 101375248 | 3/2014 |

OTHER PUBLICATIONS

Office Action of Japan Counterpart Application, with English translation thereof, dated Dec. 15, 2021, pp. 1-8.

\* cited by examiner

VEHICLE BODY

CROSS-REFERENCE TO RELATED APPLICATION

This application claims the priority benefits of Japanese application no. 2020-035965, filed on Mar. 3, 2020. The entirety of the above-mentioned patent application is hereby incorporated by reference herein and made a part of this specification.

TECHNICAL FIELD

The disclosure relates to a vehicle body including pairs of left and right support bodies that are disposed on the left and the right with an accommodation space of a power unit interposed therebetween, extend in a vehicle body forward-rearward direction, and have joint surfaces displaced rearward as the joint surfaces go outward in a vehicle width direction while facing the front; and a front bumper beam that extends in a vehicle body lateral direction across the front of the accommodation space and is joined to the joint surfaces at both ends thereof.

DESCRIPTION OF RELATED ART

Patent Document 1 discloses a vehicle body including front side frames that are disposed on the left and the right with an accommodation space of a power unit interposed therebetween and extend in a vehicle body forward-rearward direction. Bumper beam extensions are attached to front ends of the front side frames. The bumper beam extensions have joint surfaces which are displaced rearward as the joint surfaces go outward in a vehicle width direction while facing the front. Both ends of a front bumper beam are joined to the joint surfaces.

[Patent Document 1] Japanese Patent Laid-Open No. 2019-18600

In a so-called small overlap collision, one front side frame is significantly crushed in a vehicle body forward-rearward direction, whereas a tensile force acts on a left end or a right end of a front bumper beam at a front end of the other front side frame on the basis of the principle of a lever such that it comes off of a joint surface. A holding member has to have a sufficient strength to withstand a tensile force. An increase in strength results in an increase in weight of the holding member. If the left end or the right end of the front bumper beam falls off of the joint surfaces, there is concern that a power unit may stick out forward from an accommodation space between the front side frames.

SUMMARY

According to a first aspect of the disclosure, there is provided a vehicle body including pairs of left and right support bodies that are disposed on the left and the right with an accommodation space of a power unit interposed therebetween, extend in a vehicle body forward-rearward direction, and have joint surfaces displaced rearward as the joint surfaces go outward in a vehicle width direction while facing the front; and a front bumper beam that extends in a vehicle body lateral direction across the front of the accommodation space and is joined to the joint surfaces at both ends thereof. The vehicle body further includes engagement members that extend forward from inner sides of the joint surfaces in the vehicle width direction and engage with the front bumper beam in the forward-rearward direction at least at a time of a collision.

DESCRIPTION OF THE EMBODIMENT

Figure 1:
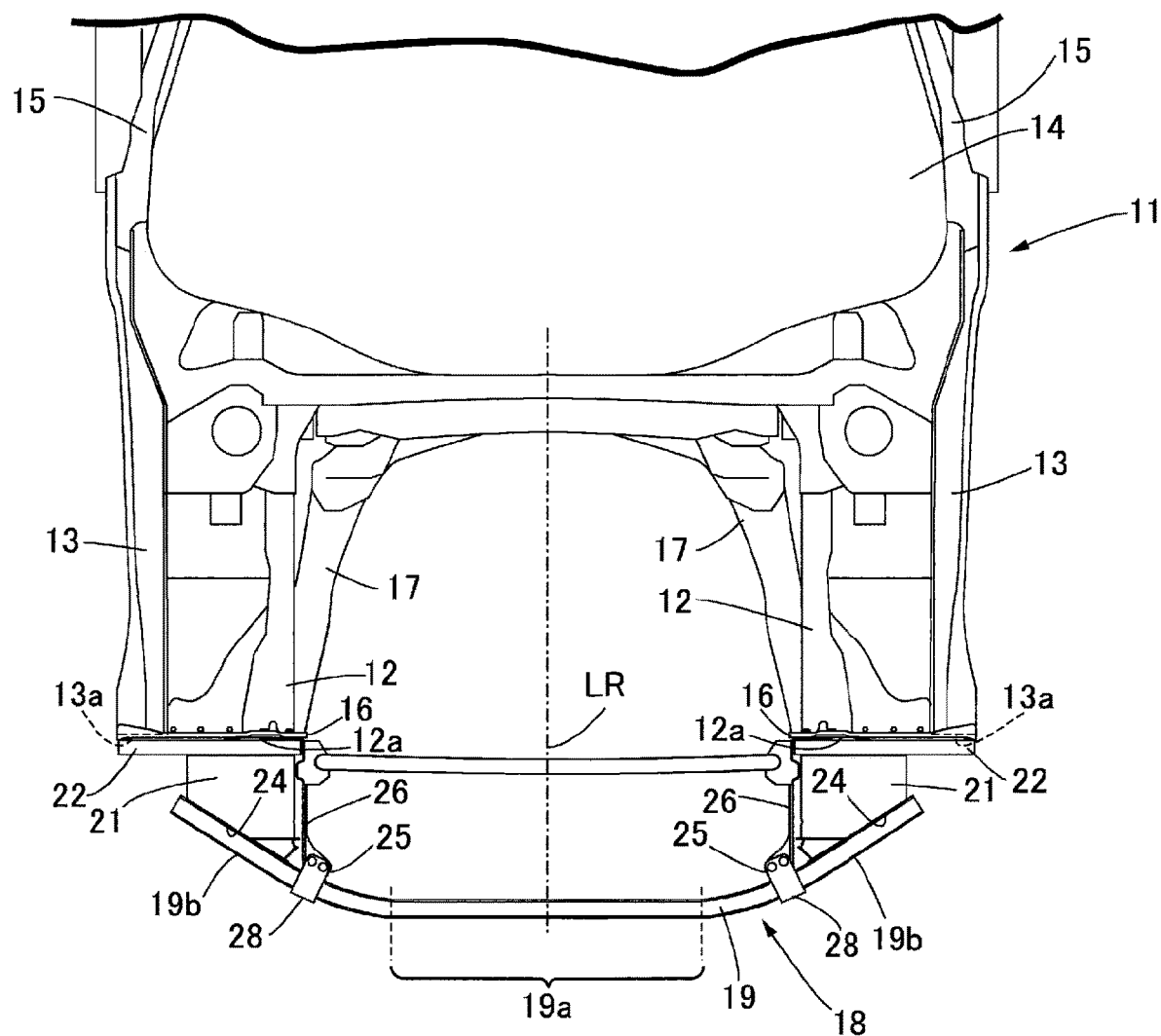
FIG. 1 is a plan view illustrating a structure of a front part of a vehicle body according to an embodiment of the disclosure.

The disclosure provides a vehicle body capable of contributing to weight reduction of a structure of a front part while preventing a front bumper beam from falling off.

According to a second aspect, in addition to the constitution according to the first aspect, the engagement member is fixed to the support body and includes a ring-shaped body which surrounds the front bumper beam around a gravity center line extending in an axial direction of the front bumper beam.

According to a third aspect, in addition to the constitution according to the first or second aspect, the engagement member includes a bracket which extends forward from the support body and faces a rear surface of the front bumper beam at a front end thereof, and a crooked member which is fixed to the front end of the bracket in an attachable/detachable manner and forms the ring-shaped body by surrounding the front bumper beam in cooperation with the front end of the bracket.

According to a fourth aspect, in addition to the constitution according to the third aspect, the support bodies include upper members which are disposed on the left and the right with the accommodation space interposed therebetween and extend in the vehicle body forward-rearward direction while being curved in a manner of protruding upward; front side frames which extend in the vehicle body forward-rearward direction side by side with the upper members; coupling plates which couple front ends of the upper members and front ends of the front side frames to each other; and attachment members which are fixed to the front bumper beam, overlap the coupling plates, and are joined to the upper members and the front side frames. The bracket has a fixing plate which is interposed between the coupling plate and the attachment member overlapping the coupling plate.

According to a fifth aspect, in addition to the constitution according to the third aspect, the bracket has a vertical plate which is held in a vertical posture by the side of the support body and extends in the vehicle body forward-rearward direction, upper and lower side legs which extend in a horizontal direction respectively from an upper edge and a lower edge of the vertical plate at a front end of the vertical plate and are joined to the crooked member, and bent flanges which are subjected to bending forming from the upper edge and the lower edge of the vertical plate toward the front end from a rear end of the vertical plate and continue to the respective corresponding side legs. Edges of the side legs draw curves which continue from edges of the bent flanges.

According to a sixth aspect, in addition to the constitution according to the third aspect, the front bumper beam has a central area which linearly extends to the left and the right from a center in a lateral direction and inclined areas which are displaced rearward from both ends of the central area as the inclined areas go outward to the left and the right and are received by the joint surfaces, and the crooked member has a plate region which expands parallel to the inclined area and faces the inclined area.

According to a seventh aspect, in addition to the constitution according to the third aspect, at least one of the bracket and the crooked member is a press-formed product of a steel plate.

According to an eighth aspect, in addition to the constitution according to the third aspect, the vehicle body further includes a plurality of fastening tools that is set at a plurality of places in parallel to the gravity center line of the front bumper beam for each of the brackets and fastens the crooked member to the bracket.

According to a ninth aspect, in addition to the constitution according to the third aspect, the support bodies include upper members which are disposed on the left and the right with the accommodation space interposed therebetween and extend in the vehicle body forward-rearward direction while being curved in a manner of protruding upward; front side frames which extend in the vehicle body forward-rearward direction side by side with the upper members; and bumper beam extensions which are fixed to front ends of the upper members and front ends of the front side frames, extend forward beyond the upper members and the front side frames, and form the joint surfaces. The bracket has a vertical plate which is maintained in a vertical posture by the side of the bumper beam extension and extends in the vehicle body forward-rearward direction; and a fixing plate which continues from a rear end of the vertical plate, has a larger height than the vertical plate in a vertical direction, and is fixed to a front end of the front side frame.

According to a tenth aspect, in addition to the constitution according to the ninth aspect, the vehicle body further includes a first fastening tool that fixes the fixing plate to the front side frame, and a second fastening tool that is disposed in a manner of being offset from the first fastening tool in a lateral direction below the first fastening tool and fixes the fixing plate to the front side frame.

According to an eleventh aspect, in addition to the constitution according to the third aspect, the support bodies include upper members which are disposed on the left and the right with the accommodation space interposed therebetween and extend in the vehicle body forward-rearward direction while being curved in a manner of protruding upward; front side frames which extend in the vehicle body forward-rearward direction side by side with the upper members; and bumper beam extensions which are fixed to front ends of the upper members and front ends of the front side frames, extend forward beyond the upper members and the front side frames, and form the joint surfaces. The bracket has a fixing plate which is joined to a front end of the front side frame, a vertical plate which is subjected to bending forming from an inner end of the fixing plate in the vehicle width direction with a gap therebetween and faces a side surface of the bumper beam extension; and a joint area which continues from the vertical plate, is connected to the fixing plate, projects toward the bumper beam extension, and is fixed to the side surface of the bumper beam extension.

According to a twelfth aspect, in addition to the constitution according to the third aspect, the bracket is formed of a steel plate having a lower tensile strength than the crooked member and a smaller plate thickness than the crooked member.

According to a thirteenth aspect, in addition to the constitution according to the third aspect, the crooked member is fixed to a front wall of the front bumper beam.

According to the first aspect, in a so-called small overlap collision, a tensile force acts on a left end or a right end of the front bumper beam such that the front bumper beam comes off of the joint surfaces on the basis of this principle with inner ends of the joint surfaces as fulcrums. Even if the left end or the right end of the front bumper beam comes off of the joint surface, since displacement of the front bumper beam in the forward-rearward direction is curbed at the inner ends of the joint surfaces, a tensile force acting on the engagement members from the front bumper beam can be avoided. Therefore, the engagement members are not required to be increased in strength. Weight reduction of the engagement members can be realized. The structure of a front part of the vehicle body can be reduced in weight. Furthermore, when the front bumper beam and the joint surfaces are coupled to each other, since application of fastening tools such as bolts for the front bumper beam is avoided, the front bumper beam is not required to be increased in strength. Weight reduction of the front bumper beam can be realized. The front bumper beam need only have a cross-sectional shape as before.

According to the second aspect, the front bumper beam can be prevented from falling off of the joint surfaces by simply causing the front bumper beam to pass through the ring-shaped body. Coupling between the front bumper beam and the support bodies can be maintained. The front bumper beam need only have a cross-sectional shape as before.

According to the third aspect, prior to forming of the ring-shaped body, the brackets and the front bumper beam can be fixed to the support bodies. In this manner, since the ring-shaped body surrounds the front bumper beam after the front bumper beam is fixed, assembling work of the front bumper beam can be efficiently performed.

According to the fourth aspect, since the fixing plate is interposed between the coupling plate and the attachment member, the bracket can be firmly fixed to the front end of the front side frame. Even if the front bumper beam projects forward in accordance with forward displacement of the power unit at the time of a collision, the front bumper beam can be favorably prevented from falling off of the front side frames.

According to the fifth aspect, a tensile force causing the front bumper beam to come off of the joint surfaces is applied to the side legs of the bracket at the time of a small overlap collision. Since the edges draw curves from the side legs to the bent flanges, stress concentration can be avoided in the bracket. A load can be smoothly transmitted from the side legs to the vertical plate.

According to the sixth aspect, the plate region of the crooked member faces the inclined area of the front bumper beam. Therefore, linear displacement of the front bumper beam in the lateral direction can be restricted by the two crooked members. The front bumper beam can be prevented from coming out of the ring-shaped body.

According to the seventh aspect, the bracket and the crooked member can be manufactured through press forming in a lightweight and inexpensive manner.

According to the eighth aspect, the engagement member can support a significant tensile load.

According to the ninth aspect, the engagement member can support a significant tensile load.

According to the tenth aspect, since a fastening area of the fixing plate expands in the vehicle width direction (lateral direction), the engagement member can support a significant tensile load.

According to the eleventh aspect, a vibration eigenvalue of the bracket can be increased on the basis of fixing of the joint area. Therefore, occurrence of vibration unpleasant to an occupant can be curbed.

According to the twelfth aspect, since a tensile strength is made equivalent between the bracket and the crooked member, the vibration eigenvalue can be increased, and occurrence of unpleasant vibration can be curbed.

According to the thirteenth aspect, since the crooked member is fixed to the front bumper beam, interference due to vibration can be curbed.

Hereinafter, an embodiment of the disclosure will be described with reference to the accompanying drawings. Here, upward, downward, forward, rearward, leftward, and rightward directions of a vehicle body are stipulated on the basis of a viewpoint of an occupant in a four-wheeled automobile.

Figure 2:
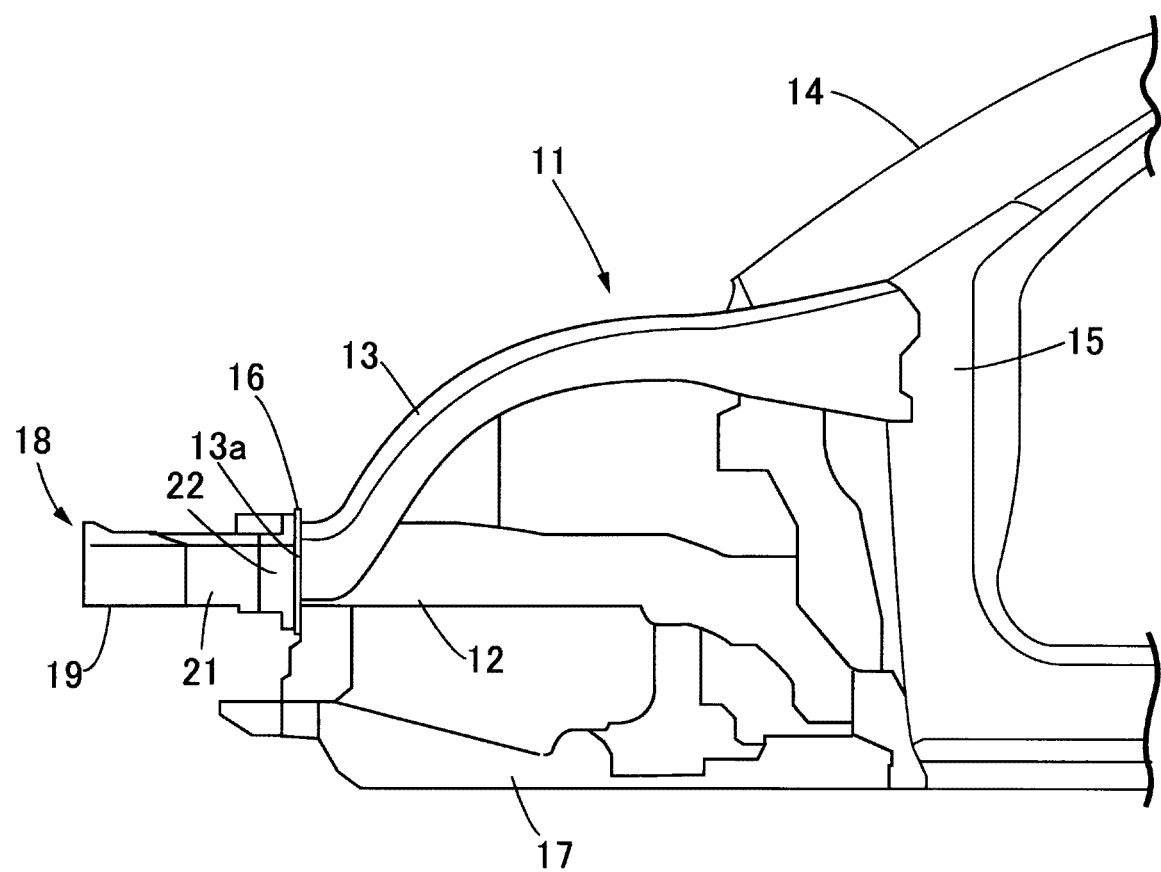
FIG. 2 is a left side view of the structure of the front part of the vehicle body.

FIG. 1 schematically illustrates a vehicle body of a vehicle according to the embodiment of the disclosure. As illustrated in FIGS. 1 and 2, a vehicle body 11 includes left and right front side frames 12 that are disposed on the left and the right at a front part of the vehicle body 11 with an accommodation space of a power unit interposed therebetween and extend in a vehicle body forward-rearward direction, left and right upper members 13 that are disposed side by side on outer sides of the front side frames 12 and extend while protruding upward in a manner of rising backward, and front pillars 15 that are joined to rear ends of the upper members 13 and support a windshield 14. Front ends 13a of the upper members 13 are disposed on the outer sides of the front side frames 12 in a vehicle width direction side by side with front ends 12a of the front side frames 12. For example, the front side frames 12, the upper members 13, and the front pillars 15 can be formed of a metal material such as an aluminum alloy or a stainless steel. The front side frames 12 and the upper members 13 can be formed to be tubular bodies having a rectangular cross section. Coupling plates 16 for coupling the front side frames 12 and the upper members 13 to each other are joined to the front ends 12a of the front side frames 12 and the front ends 13a of the upper members 13.

The vehicle body 11 includes front sub-frames 17 extending in the vehicle body forward-rearward direction below the respective front side frames 12. For example, the front sub-frames 17 can be formed of a metal material such as an aluminum alloy or a stainless steel. The front sub-frames 17 are rigidly joined to the front side frames 12. For example, welding can be adopted for joining.

A bumper beam assembly 18 is coupled to the front ends 12a of the front side frames 12 and the front ends 13a of the upper members 13. The bumper beam assembly 18 includes a front bumper beam 19 which extends in a vehicle body lateral direction (vehicle width direction) across the front of the accommodation space of the power unit, bumper beam extensions 21 which are joined to left and right ends of the front bumper beam 19 and receive a collision load input from the front bumper beam 19, and attachment members 22 which are fixed to the left and right ends of the front bumper beam 19 and joining the front bumper beam 19 to the front side frames 12 and the upper members 13. For example, the front bumper beam 19, the bumper beam extensions 21, and the coupling plates 16 can be formed of a metal material such as an aluminum alloy or a stainless steel. The front bumper beam 19 is rigidly joined to each of the bumper beam extensions 21. For example, welding can be adopted for joining. The attachment members 22 are rigidly joined to the bumper beam extensions 21. For example, welding can be adopted for joining. The attachment members 22 overlap the coupling plates 16 and are joined to the upper members 13 and the front side frames 12.

The bumper beam extensions 21 can be formed to be tubular bodies having a rectangular cross section. The bumper beam extensions 21 are formed to have a shape laterally elongated in the vehicle width direction. Each of the bumper beam extensions 21 is disposed in front of the front ends 12a of the front side frames 12 and the front ends 13a of the upper members 13.

Joint surfaces 24 displaced rearward as they go outward in the vehicle width direction while facing the front are formed in the bumper beam extensions 21. Both ends of the front bumper beam 19 are individually joined to the joint surfaces 24. The front bumper beam 19 has a central area 19a which linearly extends to the left and the right from a center LR in the lateral direction, and inclined areas 19b which are displaced rearward as they go outward to the left and the right from both ends of the central area 19a and are received by the joint surfaces 24. The front bumper beam 19 is rigidly joined to the joint surfaces 24 of the bumper beam extensions 21. Here, the upper members 13, the front side frames 12, the coupling plates 16, the attachment members 22, and the bumper beam extensions 21 form pairs of left and right support bodies having the joint surfaces 24 which are disposed on the left and the right with the accommodation space of the power unit interposed therebetween and extend in the vehicle body forward-rearward direction. For example, the vehicle body 11 can be formed to have a bilaterally symmetrical shape with respect to the center LR in the lateral direction (bilaterally symmetrical surface).

Figure 3:
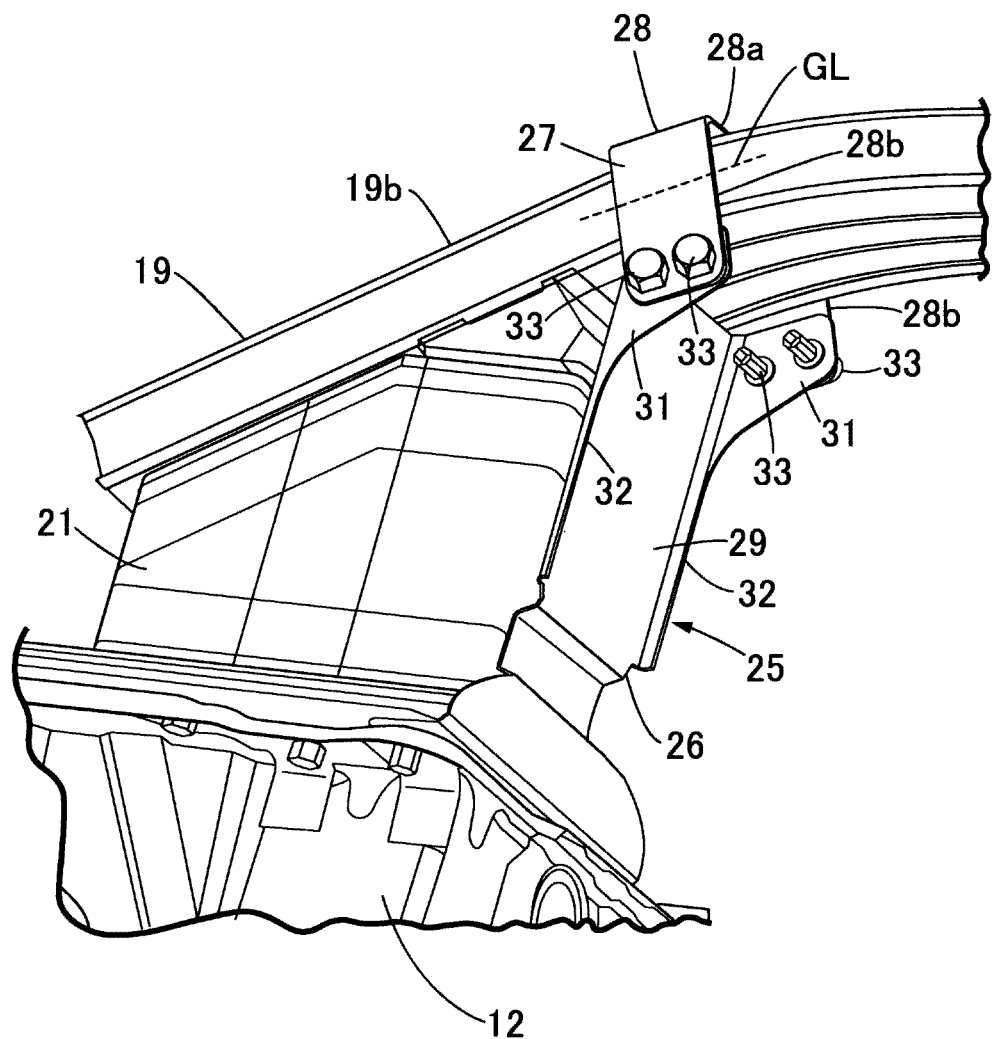
FIG. 3 is a perspective view of an engagement member observed obliquely from behind.

The vehicle body 11 includes engagement members 25 which extend forward from inner sides of the joint surfaces 24 in the vehicle width direction and engage with the front bumper beam 19 in the forward-rearward direction at least at the time of a collision. Also with reference to FIG. 3, the engagement member 25 includes a bracket 26 which extends forward from a front end of the front side frame 12 and faces a rear surface of the front bumper beam 19 at the front end, and a crooked member 28 which is fixed to the front end of the bracket 26 in an attachable/detachable manner and forms a ring-shaped body 27 in cooperation with the front end of the bracket 26. The ring-shaped body 27 surrounds the front bumper beam 19 around a gravity center line GL extending in an axial direction of the front bumper beam 19.

The bracket 26 has a vertical plate 29 which is held in a vertical posture by the side of the bumper beam extension 21 and extends in the vehicle body forward-rearward direction, upper and lower side legs 31 which extend in a horizontal direction from an upper edge and a lower edge of the vertical plate 29 at a front end of the vertical plate 29 and are joined to the crooked member 28, and bent flanges 32 which are subjected to bending forming from the upper edge and the lower edge of the vertical plate 29 toward the front end from a rear end of the vertical plate 29 and continue to the respective corresponding side legs 31. The edges of the side legs 31 draw curves which continue from edges of the bent flanges 32.

The crooked member 28 has a plate region 28a which expands in a vertical direction parallel to the inclined area 19b of the front bumper beam 19 and faces the inclined area 19b of the front bumper beam 19 from the front, and a pair of upper and lower fixing pieces 28b which is subjected to bending forming from both ends of the plate region 28a and overlaps the respective corresponding side legs 31. The fixing pieces 28b are fastened to the corresponding side legs 31 using a plurality of fastening tools 33. Here, the fastening tools 33 are set at two places in parallel to the gravity center line GL of the front bumper beam 19 for each of the fixing pieces 28b. Regarding the fastening tools 33, bolts screwed into nuts overlapping inner surfaces of the side legs 31 can be used.

Figure 4:
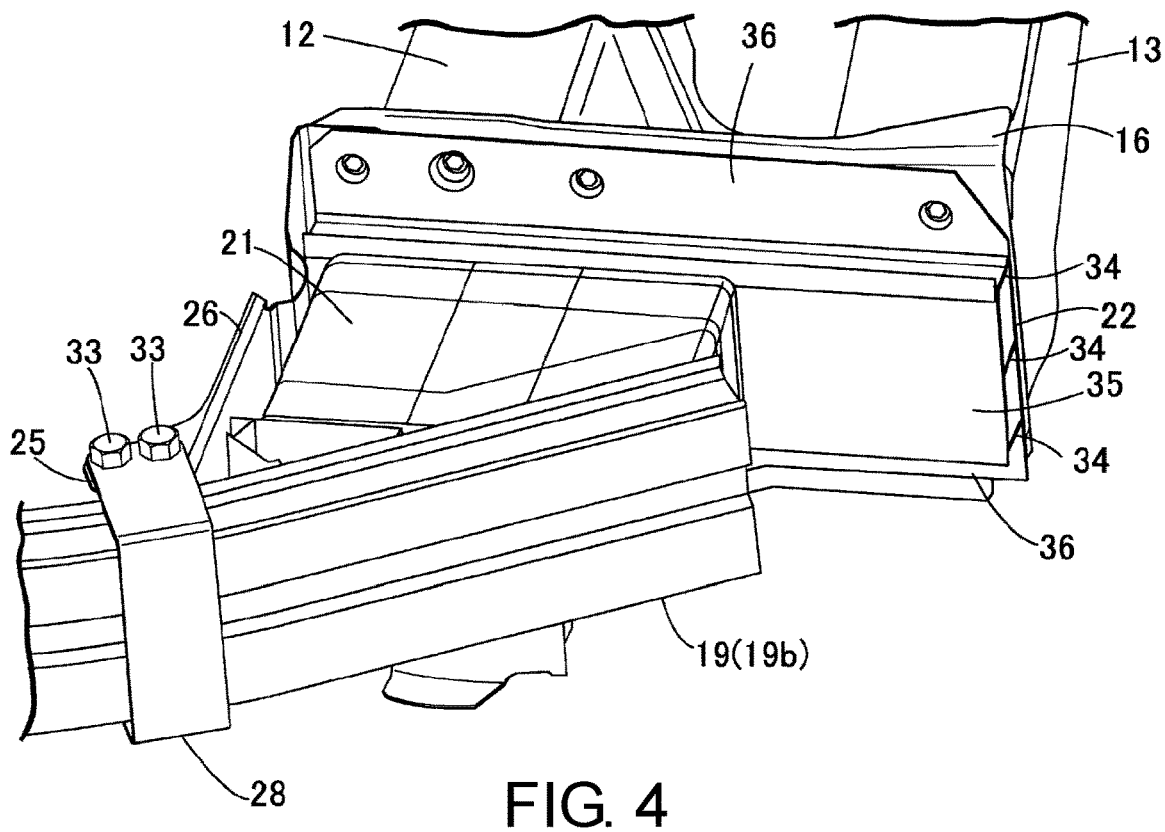
FIG. 4 is a perspective view of the engagement member observed obliquely from the front.
Figure 5:
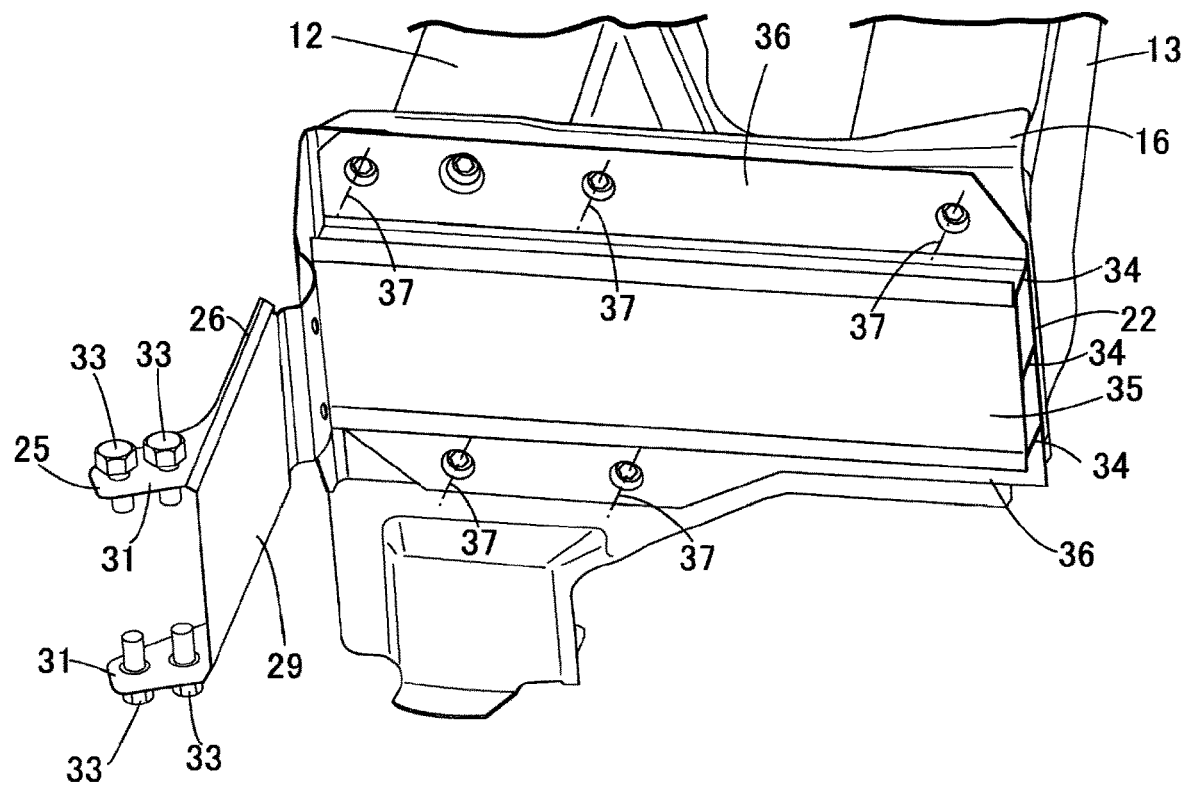
FIG. 5 is a perspective view of a bracket observed obliquely from the front in a state in which a bumper beam extension is detached.

As illustrated in FIG. 4, the attachment member 22 includes a support body 35 which has a high bending rigidity on the basis of a plurality of rising walls 34 extending in the vehicle body lateral direction and is joined to the bumper beam extension 21, and fastening pieces 36 which expand in the vertical direction from upper and lower edges of the support body 35 and overlap front surfaces of the coupling plates 16. As illustrated in FIG. 5, the fastening pieces 36 are respectively joined to the coupling plates 16 using a plurality of fastening tools 37 arrayed in the lateral direction. For example, regarding the fastening tools 37, bolts screwed into nuts fixed to back surfaces (rear surfaces) of the coupling plates 16 can be used. In FIG. 5, only axes of the bolts are illustrated for the fastening tools 37.

Figure 6:
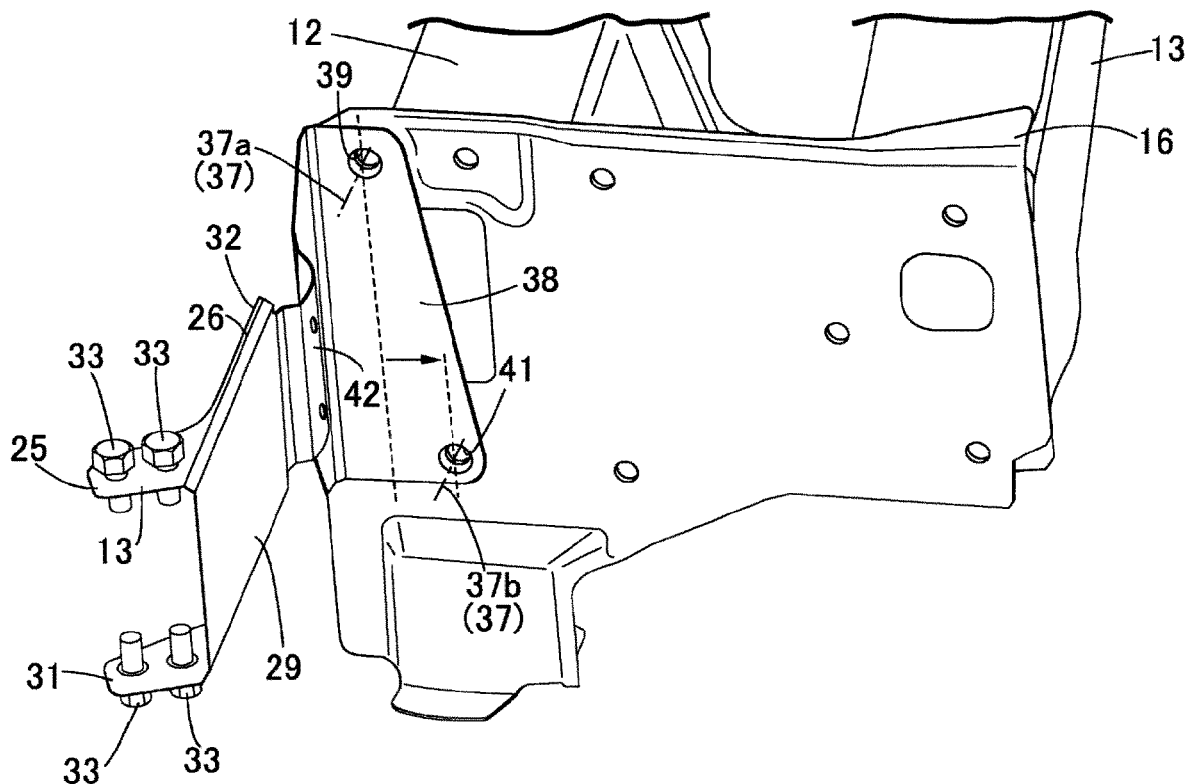
FIG. 6 is a perspective view of the bracket observed obliquely from the front in a state in which an attachment member is detached.

As illustrated in FIG. 6, the bracket 26 has a fixing plate 38 which continues from the rear end of the vertical plate 29 and is fixed to the front end of the front side frame 12. The fixing plate 38 is interposed between the coupling plate 16 and the attachment member 22 overlapping the coupling plate 16. In the fixing plate 38, a first penetration hole 39 which receives entry of a first fastening tool 37a for fixing the fixing plate 38 to the coupling plate 16, and a second penetration hole 41 which is disposed in a manner of being offset from the first penetration hole 39 in the lateral direction below the first penetration hole 39 and receives entry of a second fastening tool 37b for fixing the fixing plate 38 to the front side frame 12 are formed. The fastening tools 37a and 37b penetrate the first penetration hole 39 and the second penetration hole 41 and are jointly fastened to the coupling plate 16, the fixing plate 38, and the attachment member 22.

A joint area 42 which continues from the vertical plate 29, is connected to the fixing plate 38, projects toward the bumper beam extension 21, and is fixed to a side surface of the bumper beam extension 21 is connected to the rear end of the vertical plate 29. The joint area 42 is formed to have a protruding shape subjected to bending forming at a plurality of ridgelines extending in the vertical direction. The bent flanges 32 are disconnected at the rear end of the vertical plate 29. Therefore, the joint area 42 is crushed in the vehicle body forward-rearward direction at the time of a collision so that a retreat of the ring-shaped body 27 can be allowed.

Figure 7:
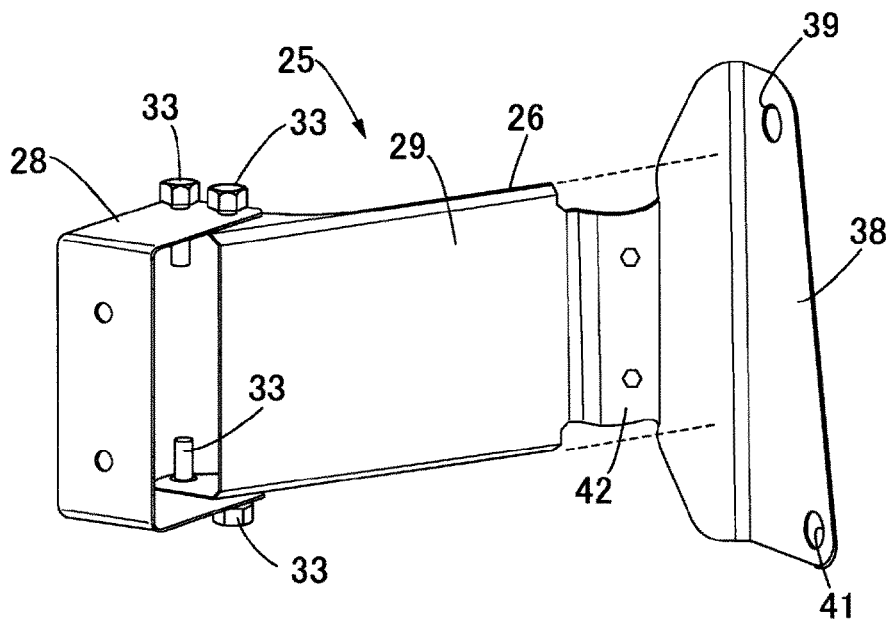
FIG. 7 is a perspective view of the engagement member.

As illustrated in FIG. 7, the fixing plate 38 of the bracket 26 has a larger height than the vertical plate 29 in the vertical direction. The bracket 26 and the crooked member 28 are constituted of a press-formed product of a steel plate. The bracket 26 is formed of a steel plate having a lower tensile strength than the crooked member 28 and a smaller plate thickness than the crooked member 28.

Figure 8:
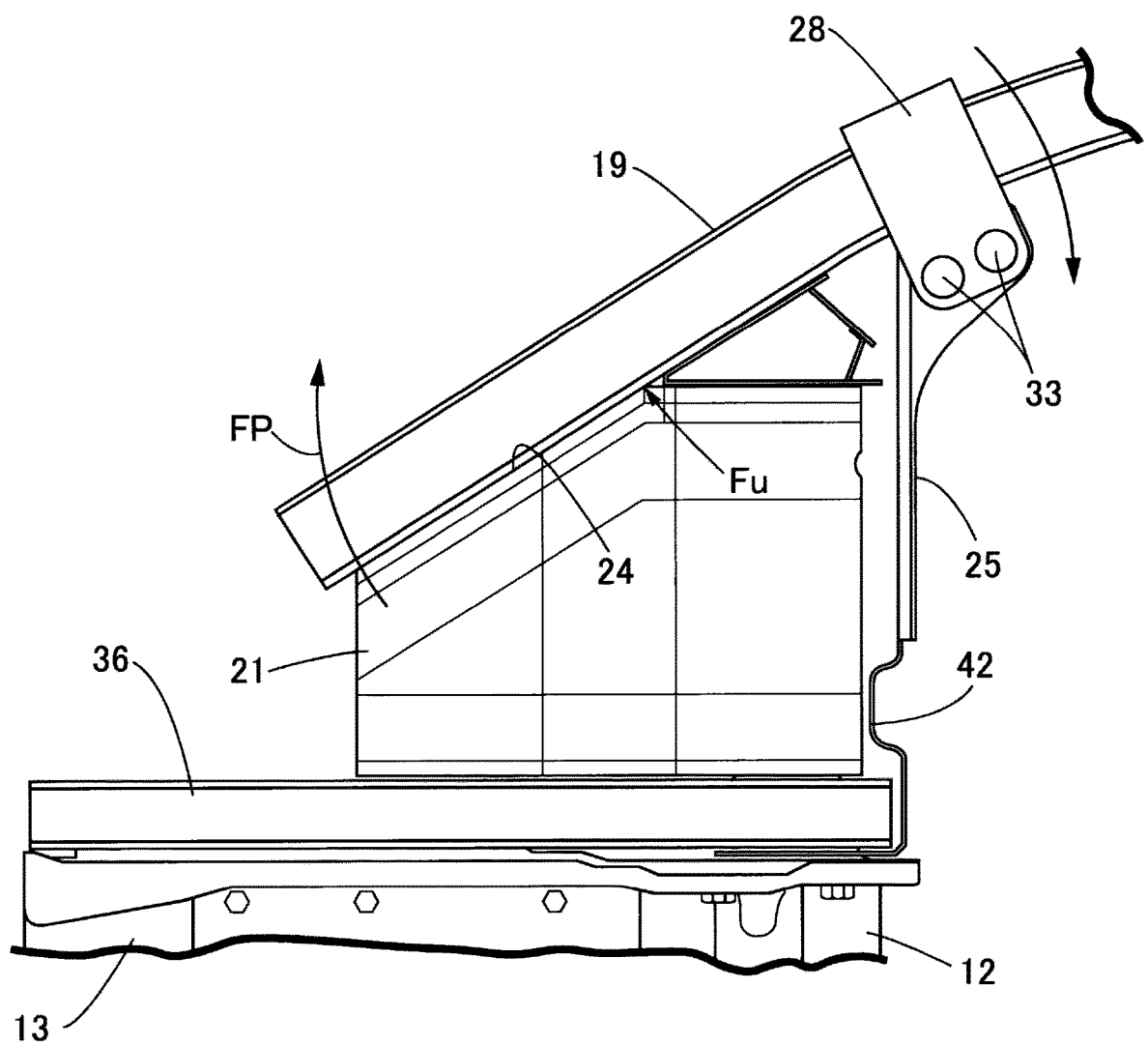
FIG. 8 is a conceptual diagram illustrating operation of a front bumper beam at a time of a small overlap collision.

In a so-called small overlap collision, one front side frame 12 is significantly crushed in the vehicle body forward-rearward direction, whereas as illustrated in FIG. 8, a tensile force FP acts on a left end or a right end of the front bumper beam 19 at a front end of the other front side frame 12 on the basis of the principle of a lever such that it comes off of the joint surface 24. At this time, even if the left end or the right end of the front bumper beam 19 comes off of the joint surface 24, since the front bumper beam 19 passes through the ring-shaped bodies 27 of the engagement members 25, coupling between the engagement members 25 fixed to the front ends 12a of the front side frames 12 and the front bumper beam 19 is maintained. The front bumper beam 19 can be prevented from falling off of the joint surfaces 24. Since the front bumper beam 19 simply passes through the ring-shaped bodies 27, the front bumper beam 19 need only have a cross-sectional shape as before.

Particularly, since a fulcrum Fu of a lever is positioned at an inner end of the joint surface 24, displacement of the front bumper beam 19 in the vehicle body forward-rearward direction can be curbed (or avoided) at the inner end of the joint surface 24. Acting of the tensile force FP from the front bumper beam 19 to the engagement members 25 can be curbed (or avoided). Therefore, the engagement members 25 are not required to be increased in strength. Weight reduction of the engagement members 25 can be realized. The structure of a front part of the vehicle body can be reduced in weight. Furthermore, when the front bumper beam 19 and the joint surfaces 24 are coupled to each other, since application of fastening tools such as bolts for the front bumper beam 19 is avoided, the front bumper beam 19 is not required to be increased in strength. Weight reduction of the front bumper beam 19 can be realized.

Here, when the front bumper beam 19 retreats around the fulcrum Fu, a collision load acts on the engagement members 25 from the front. The joint area 42 is crushed in the vehicle body forward-rearward direction so that a retreat of the ring-shaped body 27 can be allowed. As a result, a load acting on the fixing plate 38 from the vertical plate 29 of the engagement members 25 can be reduced. In this manner, joining of the engagement members 25 to the front ends 12a of the front side frames 12 can be maintained. The front bumper beam 19 can be prevented from being separated from the front ends 12a of the front side frames 12.

The engagement member 25 according to the present embodiment includes the bracket 26 which extends forward from the front side frame 12 and faces the rear surface of the front bumper beam 19 at the front end thereof, and the crooked member 28 which is fixed to the front end of the bracket 26 in an attachable/detachable manner and forms the ring-shaped body 27 by surrounding the front bumper beam 19 in cooperation with the front end of the bracket 26. Prior to forming of the ring-shaped body 27, the brackets 26 and the front bumper beam 19 can be fixed to the front side frames 12. In this manner, since the ring-shaped body 27 surrounds the front bumper beam 19 after the front bumper beam 19 is fixed, assembling work of the front bumper beam 19 can be efficiently performed.

In the present embodiment, the fixing plate 38 of the bracket 26 is interposed between the coupling plate 16 which couples the front end 13a of the upper member 13 and the front end 12a of the front side frame 12 to each other, and the attachment member 22 which is fixed to the front bumper beam 19, overlaps the coupling plate 16, and is joined to the upper member 13 and the front side frame 12. Since the fixing plate 38 is interposed between the coupling plates 16 and the attachment member 22, the bracket 26 can be firmly fixed to the front end 12a of the front side frame 12. Even if the front bumper beam 19 projects forward in accordance with forward displacement of the power unit at the time of a collision, the front bumper beam 19 can be favorably prevented from falling off of the front side frames 12.

According to the present embodiment, the bracket 26 has the vertical plate 29 which is held in a vertical posture by the side of the bumper beam extension 21 and extends in the vehicle body forward-rearward direction, the upper and lower side legs 31 which extend in the horizontal direction respectively from the upper edge and the lower edge of the vertical plate 29 at the front end of the vertical plate 29 and are joined to the crooked member 28, and the bent flanges 32 which are subjected to bending forming from the upper edge and the lower edge of the vertical plate 29 toward the front end from the rear end of the vertical plate 29 and continue to the respective corresponding side legs 31. The edges of the side legs 31 draw curves which continue from the edges of the bent flanges 32. A tensile force causing the front bumper beam 19 to come off of the joint surfaces 24 is applied to the side legs 31 of the bracket 26 at the time of a small overlap collision. Since the edges draw curves from the side legs 31 to the bent flanges 32, stress concentration can be avoided in the bracket 26. A load can be smoothly transmitted from the side legs 31 to the vertical plate 29.

The crooked member 28 according to the present embodiment has the plate region 28a which expands parallel to the inclined area 19b and faces the inclined area 19b of the front bumper beam 19. The plate region 28a of the crooked member 28 faces the inclined area 19b of the front bumper beam 19. Therefore, linear displacement of the front bumper beam 19 in the lateral direction can be restricted by the two left and right crooked members 28. The front bumper beam 19 can be prevented from coming out of the ring-shaped body 27.

In the present embodiment, at least one of the bracket 26 and the crooked member 28 is a press-formed product of a steel plate. The bracket 26 and the crooked member 28 can be manufactured through press forming in a light-weighted and inexpensive manner.

The engagement member 25 includes a plurality of fastening tools 33 that is set at a plurality of places in parallel to the gravity center line GL of the front bumper beam 19 for each of the brackets 26 and fastens the crooked member 28 to the bracket 26. The engagement member 25 can support a significant tensile load.

The bracket 26 has the vertical plate 29 which is maintained in a vertical posture by the side of the bumper beam extension 21 and extends in the vehicle body forward-rearward direction; and the fixing plate 38 which continues from the rear end of the vertical plate 29, has a larger height than the vertical plate 29 in the vertical direction, and is fixed to the front ends 12a of the front side frames 12. The engagement member 25 can support a significant tensile load.

In the present embodiment, when the fixing plate 38 is fixed, the first fastening tool 37a that fixes the fixing plate 38 to the front side frame 12, and the second fastening tool 37b that is disposed in a manner of being offset from the first fastening tool 37a in the lateral direction below the first fastening tool 37a and fixes the fixing plate 38 to the front side frame 12 are used. Since a fastening area of the fixing plate 38 expands in the vehicle width direction (lateral direction), the engagement member 25 can support a significant tensile load.

The bracket 26 has the fixing plate 38 which is joined to the front ends 12a of the front side frames 12, the vertical plate 29 which is subjected to bending forming from the inner end of the fixing plate 38 in the vehicle width direction with a gap therebetween and faces the side surface of the bumper beam extension 21, and the joint area 42 which continues from the vertical plate 29, is connected to the fixing plate 38, projects toward the bumper beam extension 21, and is fixed to the side surface of the bumper beam extension 21. A vibration eigenvalue of the bracket 26 can be increased on the basis of fixing of the joint area 42. Therefore, occurrence of vibration unpleasant to an occupant can be curbed.

The bracket 26 is formed of a steel plate having a lower tensile strength than the crooked member 28 and a smaller plate thickness than the crooked member 28. Since a tensile strength is made equivalent between the bracket 26 and the crooked member 28, the vibration eigenvalue can be increased, and occurrence of unpleasant vibration can be curbed.

Figure 9:
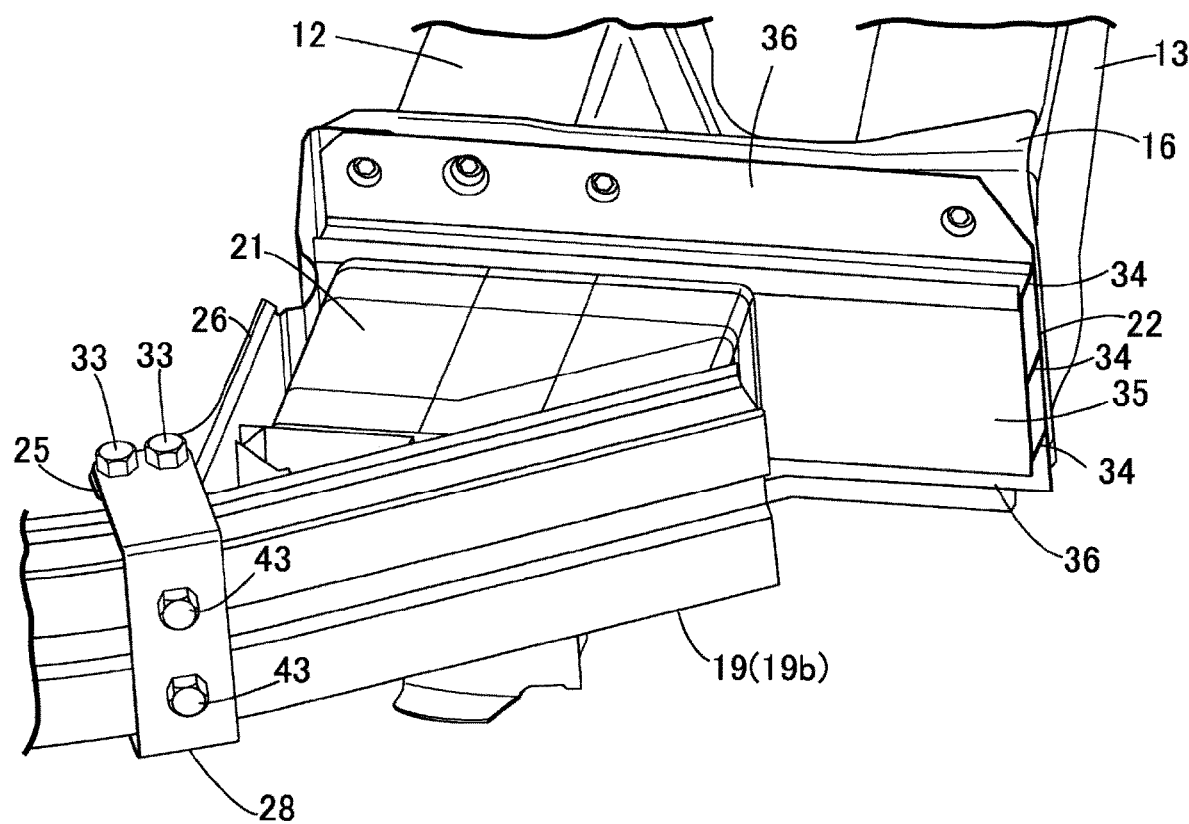
FIG. 9 is a perspective view, corresponding to FIG. 4, of the engagement member observed obliquely from the front when a crooked member of the engagement member is fixed to a front wall of the front bumper beam.

As illustrated in FIG. 9, the crooked member 28 may be fixed to a front wall of the front bumper beam 19. For example, fastening tools such as bolts 43 can be used for performing fixing. The bolts 43 may be screwed into screw holes drilled in the front wall of the front bumper beam 19. Since the crooked member 28 is fixed to the front bumper beam 19, interference due to vibration can be curbed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle body (11) comprising:
   pairs of left and right support bodies (12, 13, 16, 21, and 22) that extend in a vehicle body forward-rearward direction, and have joint surfaces (24) displaced rearward as the joint surfaces (24) go outward in a vehicle width direction while facing the front;
   a front bumper beam (19) that extends in a vehicle body lateral direction and is joined to the joint surfaces (24) at both ends thereof; and
   engagement members (25) that extend forward from inner sides of the joint surfaces (24) in the vehicle width direction and engage with the front bumper beam (19) in the forward-rearward direction at least at a time of a collision, wherein
   the engagement member (25) includes a ring-shaped body (27), and
   the ring-shaped body (27) is fixed to the support body and surrounds the front bumper beam (19) around a gravity center line (GL) extending in an axial direction of the front bumper beam (19).

2. The vehicle body according to claim 1, wherein the engagement member (25) includes:
   a bracket (26) which extends forward from the support body and faces a rear surface of the front bumper beam (19) at a front end thereof; and
   a crooked member (28) which is fixed to the front end of the bracket (26) in an attachable/detachable manner and forms the ring-shaped body (27) by surrounding the front bumper beam (19) in cooperation with the front end of the bracket (26).

3. The vehicle body according to claim 2, wherein the support bodies include:

upper members (13) which extend in the vehicle body forward-rearward direction while being curved in a manner of protruding upward;

front side frames (12) which extend in the vehicle body forward-rearward direction side by side with the upper members (13);

coupling plates (16) which couple front ends (13a) of the upper members (13) and front ends (12a) of the front side frames (12) to each other; and attachment members (22) which are fixed to the front bumper beam (19), overlap the coupling plates (16), and are joined to the upper members (13) and the front side frames (12), wherein the bracket (26) has a fixing plate (38) which is interposed between the coupling plate (16) and the attachment member (22) overlapping the coupling plate (16).

4. The vehicle body according to claim 2, wherein the bracket (26) has:

a vertical plate (29) which is held in a vertical posture by the side of the support body and extends in the vehicle body forward-rearward direction;

upper and lower side legs (31) which extend in a horizontal direction respectively from an upper edge and a lower edge of the vertical plate (29) at a front end of the vertical plate (29) and are joined to the crooked member (28); and bent flanges (32) which are subjected to bending forming from the upper edge and the lower edge of the vertical plate (29) toward the front end from a rear end of the vertical plate (29) and continue to the respective corresponding side legs (31), wherein edges of the side legs (31) draw curves which continue from edges of the bent flanges (32).

5. The vehicle body according to claim 2, wherein the front bumper beam (19) has:

a central area (19a) which linearly extends to the left and the right from a center in a lateral direction; and inclined areas (19b) which are displaced rearward from both ends of the central area (19a) as the inclined areas (19b) go outward to the left and the right and are received by the joint surfaces (24), wherein the crooked member (28) has a plate region (28a) which expands parallel to the inclined area (19b) and faces the inclined area (19b).

6. The vehicle body according to claim 2, wherein at least one of the bracket (26) and the crooked member (28) is a press-formed product of a steel plate.

7. The vehicle body according to claim 2, further comprising:

a plurality of fastening tools (33) that is set at a plurality of places in parallel to the gravity center line (GL) of the front bumper beam (19) for each of the brackets (26) and fastens the crooked member (28) to the bracket (26).

8. The vehicle body according to claim 2, wherein the support bodies include:

upper members (13) which extend in the vehicle body forward-rearward direction while being curved in a manner of protruding upward;

front side frames (12) which extend in the vehicle body forward-rearward direction side by side with the upper members (13); and bumper beam extensions (21) which are fixed to front ends (13a) of the upper members (13) and front ends (12a) of the front side frames (12), extend forward beyond the upper members (13) and the front side frames (12), and form the joint surfaces (24), wherein the bracket (26) has:

a vertical plate (29) which is maintained in a vertical posture by the side of the bumper beam extension (21) and extends in the vehicle body forward-rearward direction; and a fixing plate (38) which continues from a rear end of the vertical plate (29), has a larger height than the vertical plate (29) in a vertical direction, and is fixed to a front end of the front side frame (12).

9. The vehicle body according to claim 8, further comprising:

a first fastening tool (37a) that fixes the fixing plate (38) to the front side frame (12); and a second fastening tool (37b) that is disposed in a manner of being offset from the first fastening tool (37a) in a lateral direction below the first fastening tool (37a) and fixes the fixing plate (38) to the front side frame (12).

10. The vehicle body according to claim 2, wherein the support bodies include:

upper members (13) which extend in the vehicle body forward-rearward direction while being curved in a manner of protruding upward;

front side frames (12) which extend in the vehicle body forward-rearward direction side by side with the upper members (13); and bumper beam extensions (21) which are fixed to front ends of the upper members (13) and front ends of the front side frames (12), extend forward beyond the upper members (13) and the front side frames (12), and form the joint surfaces (24), wherein the bracket (26) has:

a fixing plate (38) which is joined to a front end (12a) of the front side frame (12);

a vertical plate (29) which is subjected to bending forming from an inner end of the fixing plate (38) in the vehicle width direction with a gap therebetween and faces a side surface of the bumper beam extension (21); and a joint area (42) which continues from the vertical plate (29), is connected to the fixing plate (38), projects toward the bumper beam extension (21), and is fixed to the side surface of the bumper beam extension (21).

11. The vehicle body according to claim 2, wherein the bracket (26) is formed of a steel plate having a lower tensile strength than the crooked member (28) and a smaller plate thickness than the crooked member.

12. The vehicle body according to claim 2, wherein the crooked member (28) is fixed to a front wall of the front bumper beam (19).

* * * * *